United States Patent
Snook et al.

(10) Patent No.: US 6,565,137 B1
(45) Date of Patent: May 20, 2003

(54) TABLE TOP LIFT ASSEMBLY FOR CENTER STACK

(75) Inventors: Michael Snook, Worchester (GB); Nick Xiromeritis, Southfield, MI (US); Tamas Karacsonyi, Wuppertal (DE); Marc Clark, Burscheid (DE)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/661,186

(22) Filed: Sep. 13, 2000

(51) Int. Cl.⁷ .......................... B60R 11/00; A47B 23/04
(52) U.S. Cl. .................. 296/24.1; 296/26.09; 108/44; 108/147; 224/281; 74/89.28; 414/347
(58) Field of Search ........................ 276/24.1; 108/44, 108/147; 224/281, 282, 564; 296/26.09; 414/345, 347; 74/89.25, 89.28, 422

(56) References Cited

U.S. PATENT DOCUMENTS

| | | | | |
|---|---|---|---|---|
| 3,939,986 A | * | 2/1976 | Pierro .......................... 108/44 |
| 4,124,096 A | * | 11/1978 | Dudynskyj et al. .......... 187/9 R |
| 4,353,436 A | * | 10/1982 | Rice et al. .................... 187/9 R |
| 4,590,865 A | * | 5/1986 | Rutsche et al. .............. 108/147 |
| 4,747,353 A | * | 5/1988 | Watt ............................. 108/147 |
| 4,852,932 A | * | 8/1989 | Komeya et al. ............. 224/281 |
| 5,372,403 A | * | 12/1994 | Puerto ....................... 297/188.17 |
| 5,375,805 A | * | 12/1994 | Sudak et al. ............... 248/311.2 |
| 5,489,054 A | * | 2/1996 | Schiff ........................... 224/281 |
| 5,549,053 A | * | 8/1996 | Grout ........................... 108/147 |
| 5,601,269 A | * | 2/1997 | Jankovic ....................... 224/281 |
| 5,687,651 A | * | 11/1997 | Hurayt et al. ................. 108/44 |
| 5,692,658 A | * | 12/1997 | Fischer et al. ................ 224/281 |
| 5,749,554 A | * | 5/1998 | Avila et al. ................ 248/311.2 |
| 5,765,736 A | * | 6/1998 | Fischer et al. ................ 224/281 |
| 5,899,426 A | * | 5/1999 | Gross et al. ............... 248/311.2 |
| 5,996,866 A | * | 12/1999 | Susko et al. .................. 224/281 |
| 5,997,092 A | * | 12/1999 | Slaven .......................... 224/281 |
| 6,024,025 A | * | 2/2000 | Koch et al. ................... 108/147 |
| 6,032,587 A | * | 3/2000 | Salenbauch et al. .......... 108/44 |
| 6,220,660 B1 | * | 4/2001 | Bedro et al. .................. 108/44 |
| 6,286,441 B1 | * | 9/2001 | Burdi et al. ................... 108/147 |
| 6,345,547 B1 | * | 2/2002 | Stoelinga et al. ........... 108/147 |
| 6,474,246 B2 | * | 11/2002 | Hsu ............................. 108/147 |

FOREIGN PATENT DOCUMENTS

JP        2000-177467      *   6/2000

* cited by examiner

Primary Examiner—D. Glenn Dayoan
Assistant Examiner—H. Gutman
(74) Attorney, Agent, or Firm—Foley & Lardner

(57) ABSTRACT

A center console assembly for use in a vehicle includes a table capable of being disposed within a center console. A linear drive mechanism is coupled to the table. The linear drive mechanism includes a driver capable of moving the table from a retracted position within the center console to an extracted position outside of the center console.

18 Claims, 8 Drawing Sheets

TABLE TOP LIFT ASSEMBLY FOR CENTER STACK

BACKGROUND OF THE INVENTION

1. Technical Field

This invention generally relates to a vehicle interior and, more particularly, to a center console having a collapsible table top assembly with a linear lift mechanism.

2. Background

With ever increasing pressure from automotive customers, flexibility and adaptivity of vehicle interiors is increasingly required in order to provide a vehicle that meets broader customer demands. Increases in travel distances and time spent within vehicles have led consumers to consistently request surfaces within the vehicle which allow for activities such as work, play or food consumption. Traditionally, vehicles have used table top assemblies disposed throughout the vehicle which utilize four bar linkages or the like to raise or lower a table top surface, which negatively affects the storage efficiency of the system. Further, in certain circumstances, items trapped in the lifting mechanism of four bar linkages can cause the mechanism to malfunction.

The present invention provides a storable and foldable table assembly that provides a convenient surface for use by occupants within a vehicle. The table assembly of the present invention provides a platform folded and enclosed within a center console that is generally located between a vehicle's seats. In addition, the foldable table includes a linear drive for positioning or retracting the table assembly. The foldable table can include surfaces for engaging small interior trim components such as an ashtray and cup holder.

SUMMARY OF THE INVENTION

Accordingly, this invention provides a foldable table for a center console that overcomes the problems and disadvantages of the conventional table lift mechanisms. Briefly, the invention includes a center console, a table capable of being disposed within the center console, and a linear drive mechanism coupled to the table. The linear drive mechanism is capable of moving the table from within the console to outside of the console. Upon leaving the console, a pair of side wings of the table unfold and the table positions itself in a position convenient for use by vehicle occupants. The linear drive mechanism is space efficient and substantially reduces the possibility of items interfering with the table lift mechanism, as compared to four bar linkages that are prone to having extraneous items trapped in the lifting mechanism.

Further disclosed is a center console assembly for a vehicle disposed between a pair of seats. The center console defines an interior cavity. A foldable table is coupled to a linear drive mechanism which is capable of being slidably received within said interior cavity. The linear drive mechanism functions to move the foldable table from inside the console to a position outside of the console.

Further disclosed is a linear drive mechanism for a foldable table. The drive mechanism has a screw drive mechanism which is coupled to a U-channel member. Disposed on the U-channel member is a table lifter which is driven by a pair of gears.

BRIEF DESCRIPTION OF THE DRAWINGS

The various advantages of the present invention will become apparent to one skilled in the art upon reading the following specification and by reference to the drawings in which.

DETAILED DESCRIPTION OF THE PREFERRED EMBODIMENT

The following description of the preferred embodiment is merely exemplary in nature, and is in no way intended to limit the invention, or its application, or uses.

Figure 1:
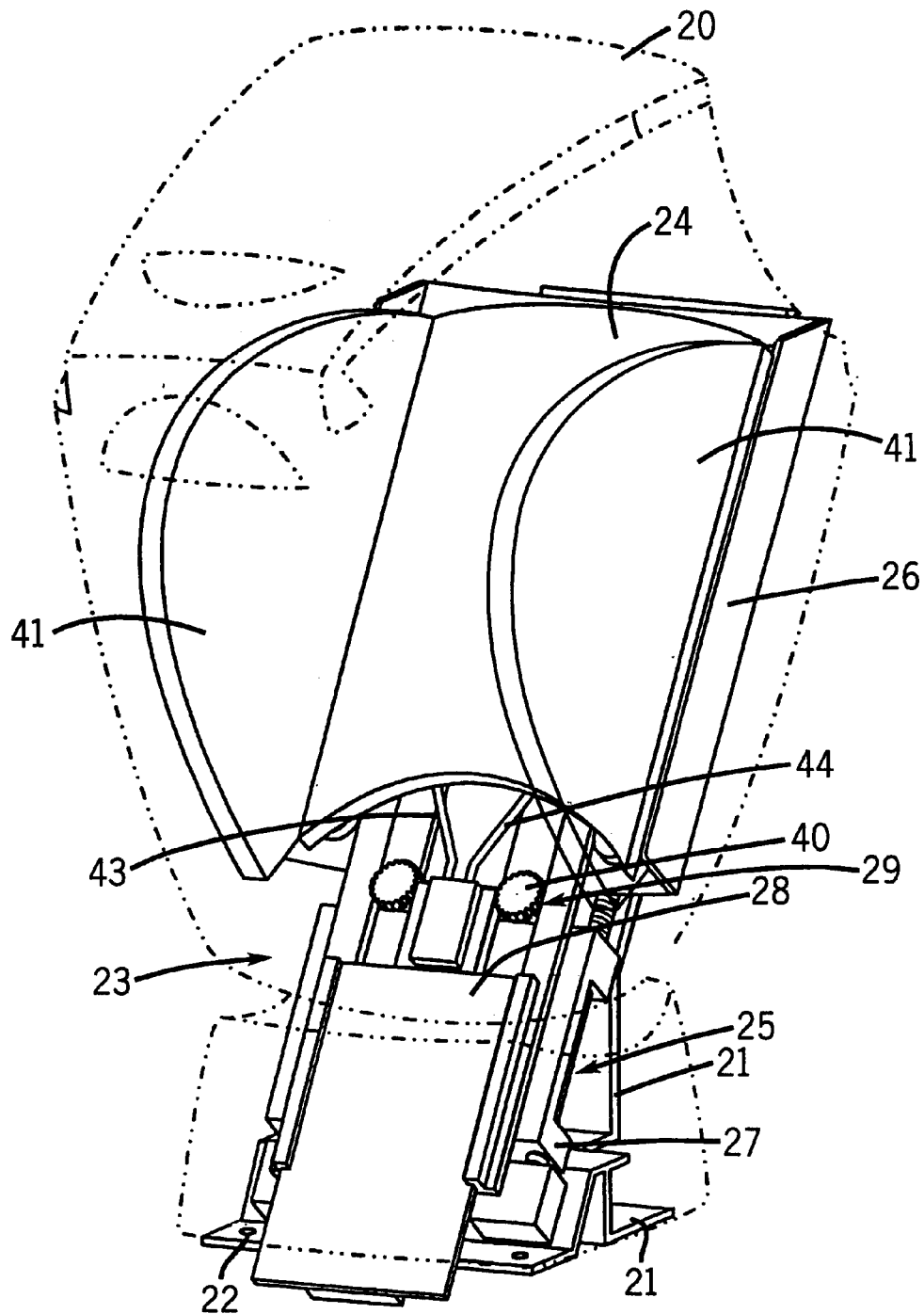
FIGS. 1 and 2 provide front and rear views of the table assembly in its fully retracted position.
Figure 2:
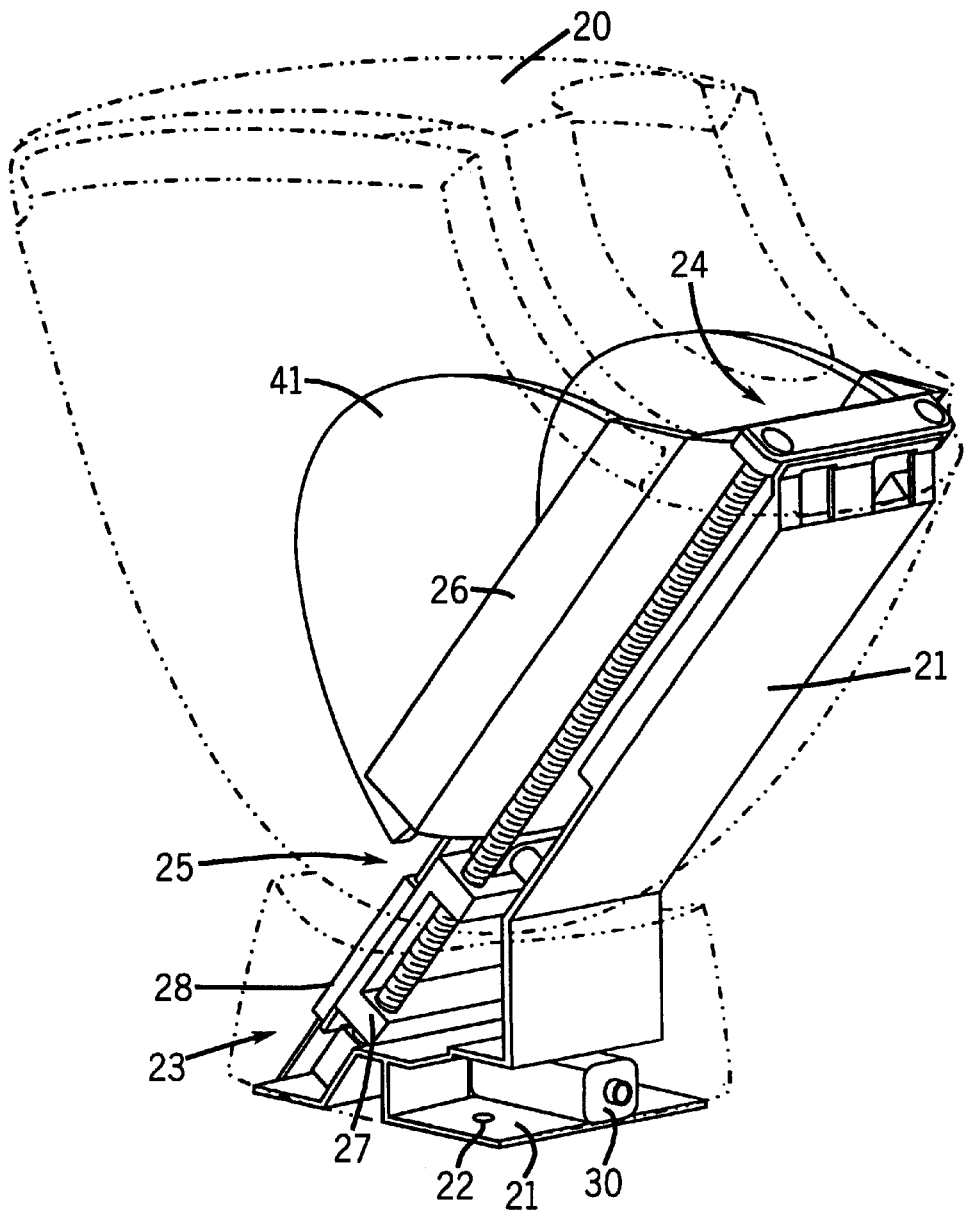
Figure 3:
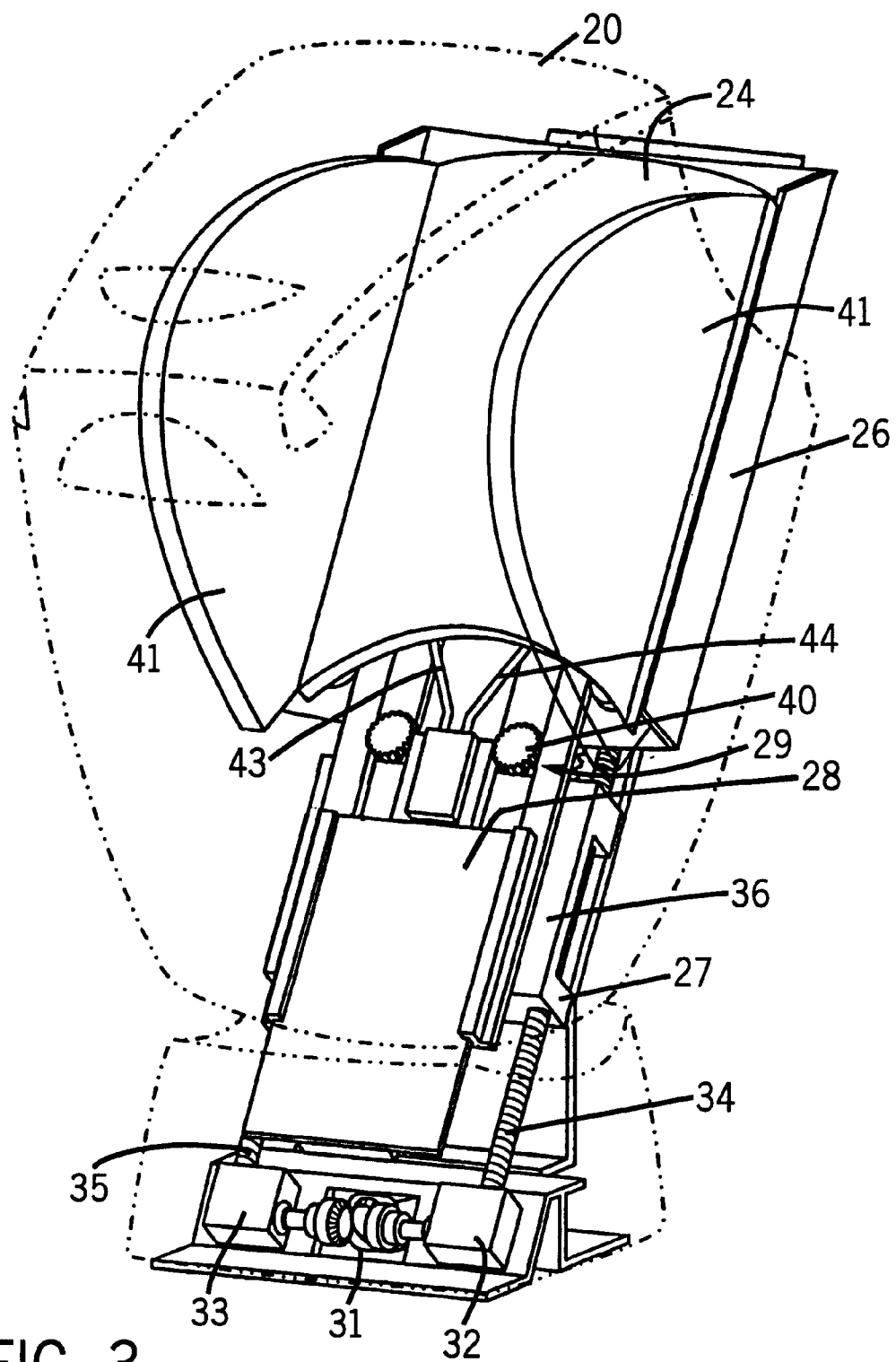
FIGS. 3 and 4 represent front and rear views of the foldable table assembly in the first stage of extraction from the center console.
Figure 4:
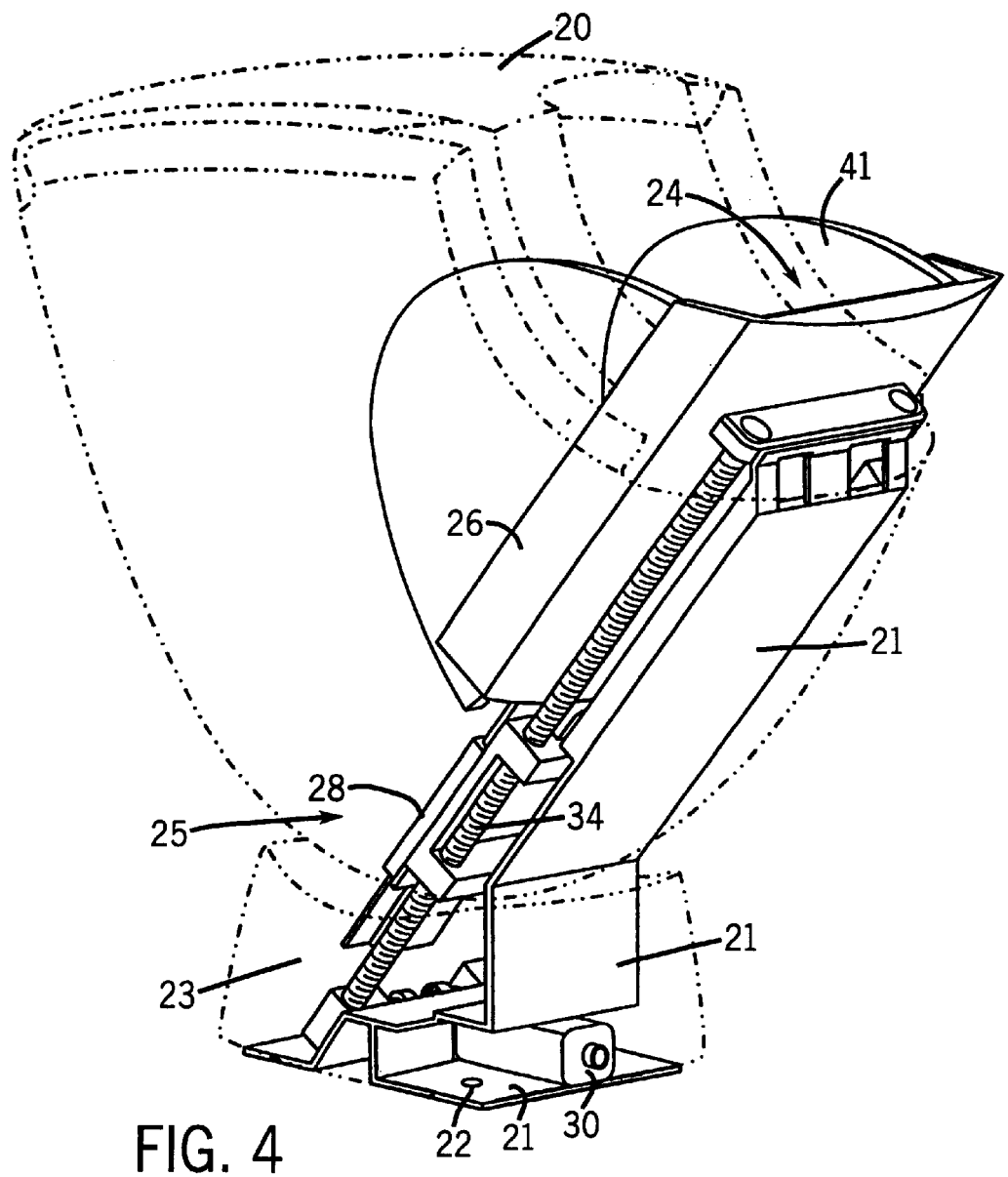

Referring to FIGS. 1 and 2, there is shown a center console assembly 20 which is located between a pair of seats (not shown) in the front cockpit area of a vehicle, and is preferably supported by the floor of the vehicle. Disposed within the center console assembly 20 is a support member 21 coupled to the floor by use of standard fasteners 22. The support member 21 supports a lift mechanism 23 for a folded table 24. The lift mechanism 23 is composed of a primary drive mechanism 25 which drives a U-channel member 26 using a primary driven member 27. A folded table 24 is housed within the U-channel member 26 and is coupled to a table lifter 28. The table lifter 28 is driven by a secondary drive mechanism 29 (further detailed in FIGS. 5 and 6) and is coupled to the folded table 24 by a hinge (not shown).

Figure 5:
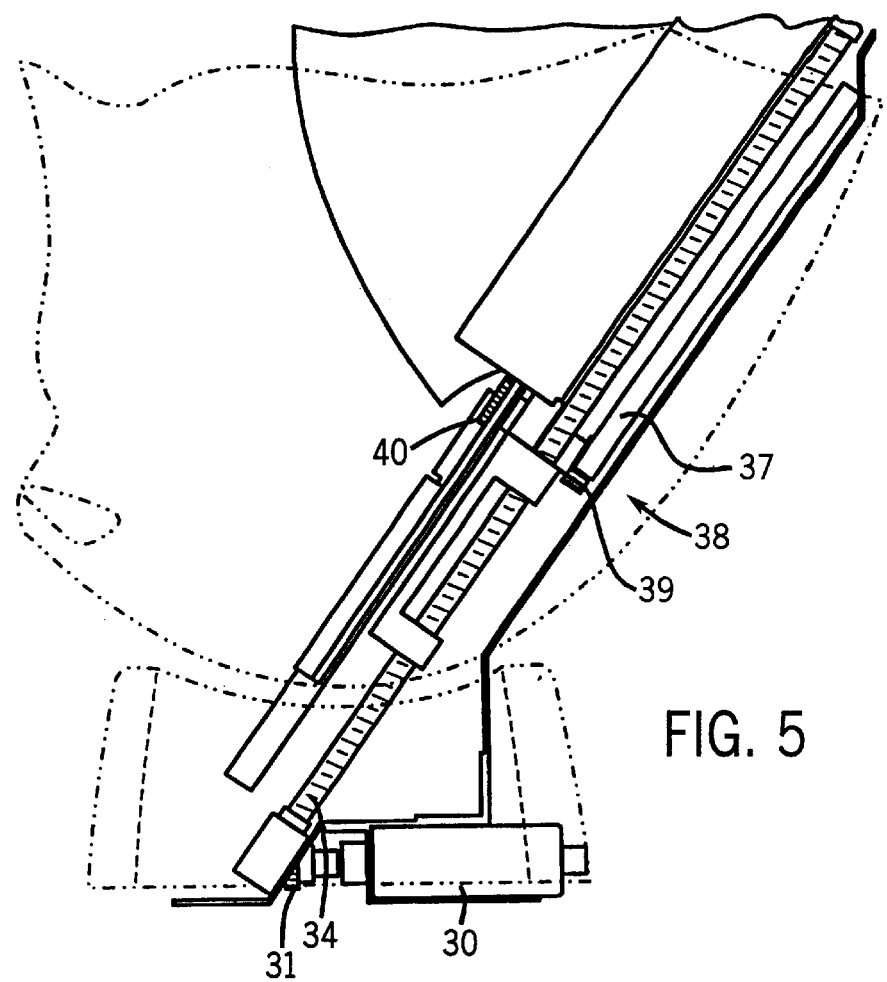
FIG. 5 provides a more detailed cut-away side views of the linear drive mechanism of the foldable table assembly depicting a differential mechanism and a screw drive member.
Figure 6:
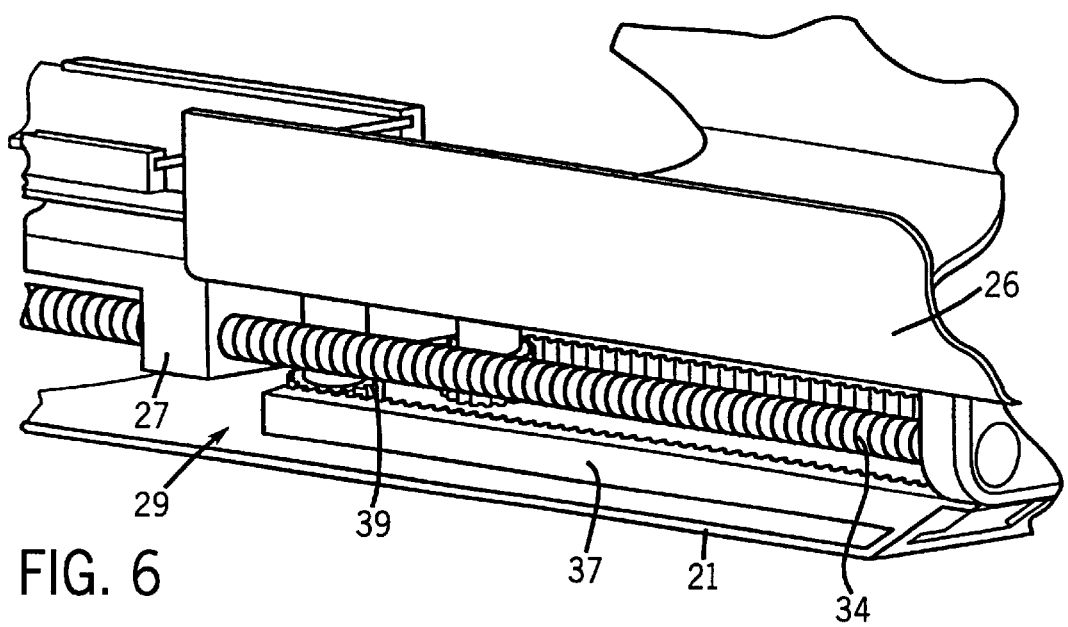
FIG. 6 provides a more detailed cut-away perspective view of the linear drive mechanism of the foldable table assembly depicting a driven gear and toothed channel of a secondary drive mechanism.
Figure 8:
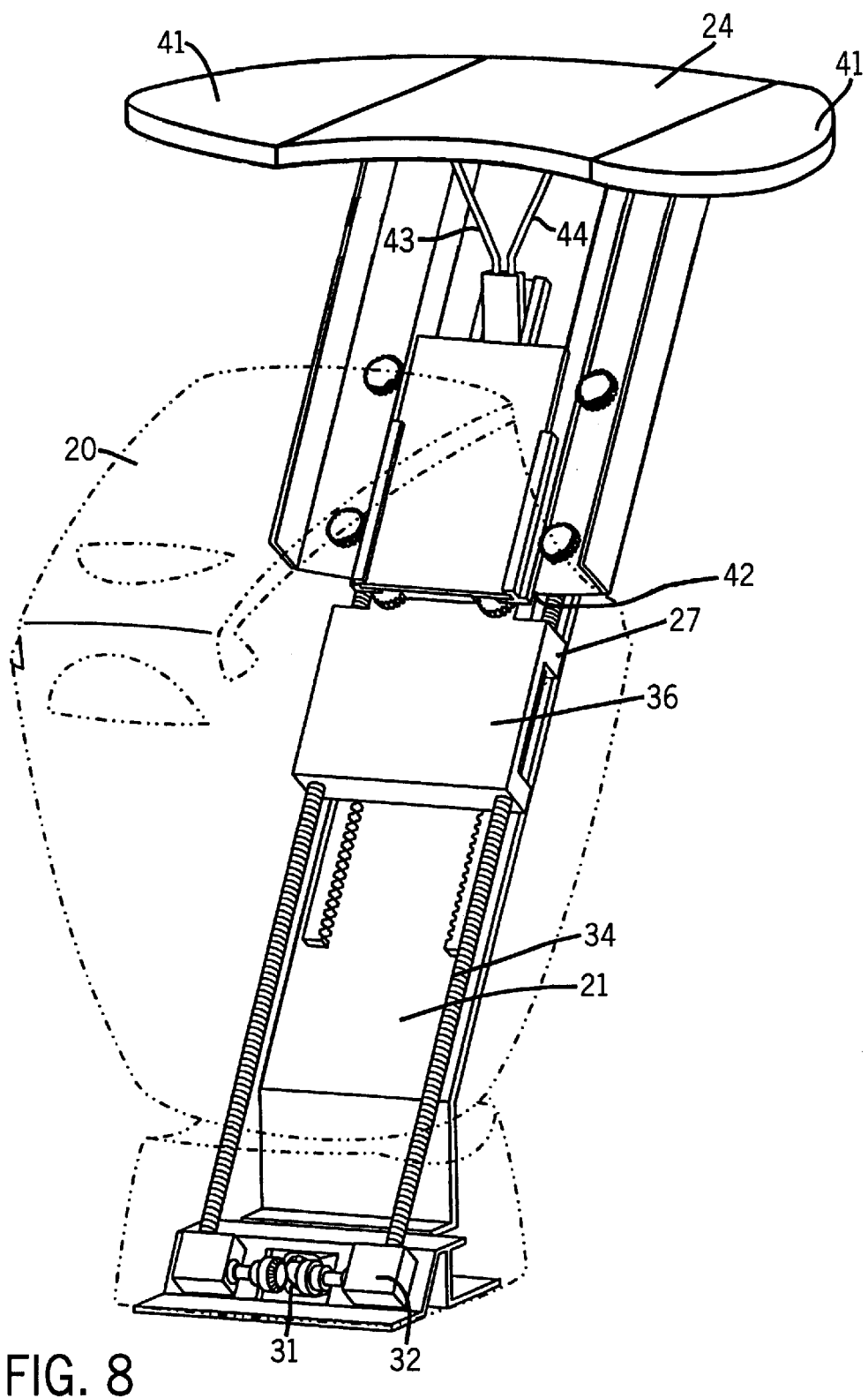
FIG. 8 represents a front view of the foldable table assembly of the present invention with the table in its fully extracted position.

The primary drive mechanism 25 is driven by a drive motor 30 which is mounted to the support member 21. The drive motor 30 drives a differential mechanism 31, which through a pair of couplings 32 and 33 rotates a pair of screw drive members 34 and 35. The primary driven member 27 is coupled to the screw drive members 34 and 35 and forms a platform 36 which is coupled to the U-channel member 26. Referring to FIG. 8, an upper side 42 of the platform 36 can couple with the U-channel member 26. The platform 36 supports the secondary drive mechanism 29 which interacts with a toothed channel 37 on the support member 21 to provide a driving force to the table lifter 28. The table lifter 28 is designed so as to travel at twice the speed of the U-channel member 26 when the U-channel member 26 is driven past a first point 38. As best seen in FIGS. 5 and 6, the entire table lifter 28 is driven up by the rotation of the motor 30 and hence the screw drive members 34 and 35.

The primary driven member 27, which drives the table lifter 28, which in turn drives the table 24, is raised to the first point 38 where the secondary drive mechanism 29 is actuated. This actuation occurs when a driven gear 39 of the secondary drive mechanism 29 engages the toothed channel 37 of the support member 21 (see FIGS. 1 and 6). The driven gear 39 rotates and drives a drive gear 40 in the secondary drive mechanism 29. During this stage of the lifting, the gears 39 and 40 are configured so that the table lifter moves at twice the speed of the U-channel member 26. This allows the folded table to be extracted from the U-channel member 26.

Figure 9:
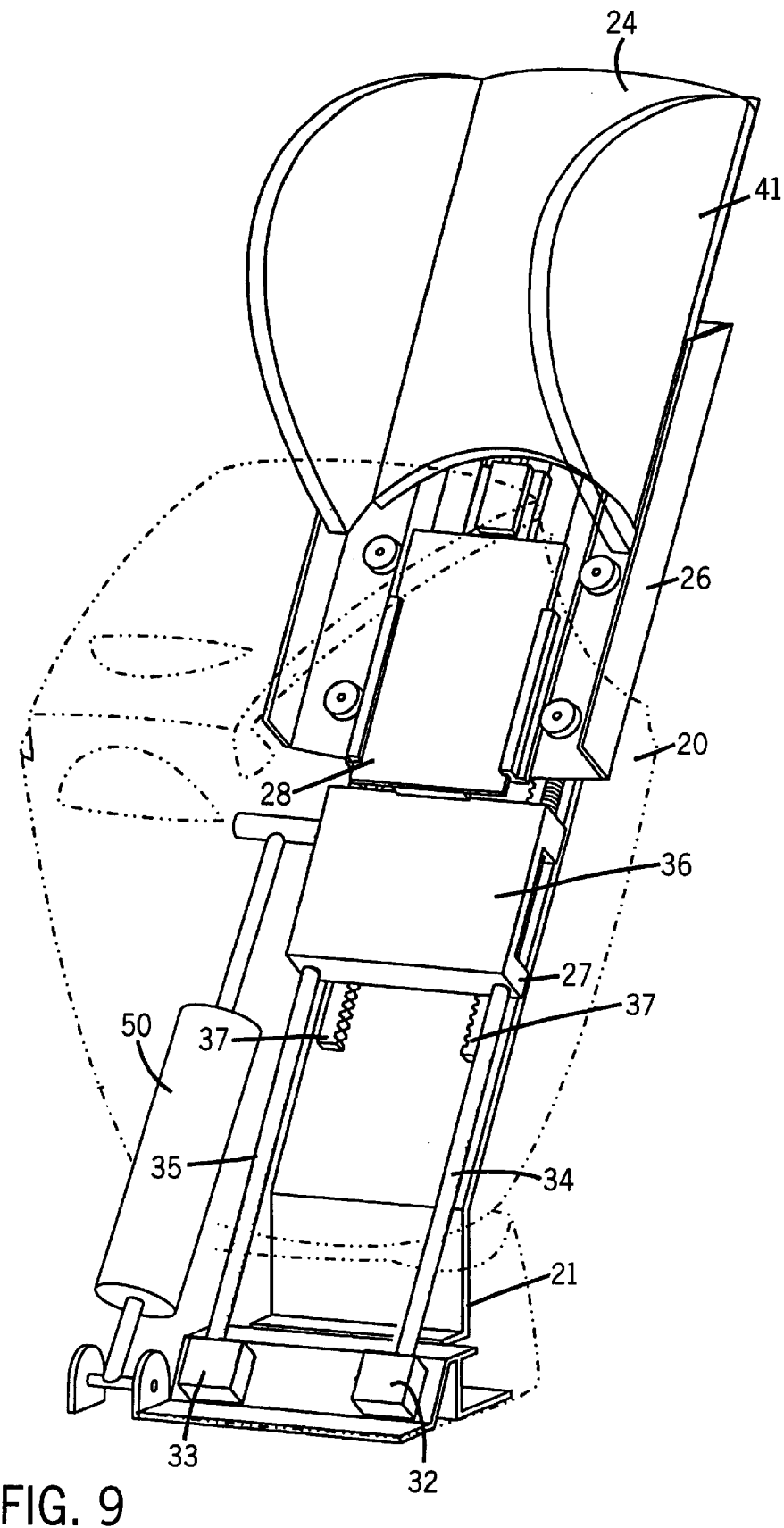
FIG. 9 shows a front perspective view of the foldable table assembly in accordance with an alternative embodiment.

It is also envisioned that the primary drive mechanism 25 could be driven by other means for driving. These include the use of a hand crank system (not shown) coupled to the differential mechanism 31. Additionally, an optional pneumatic cylinder 50 can be used to move the platform 36 from within the console (see FIG. 9). In this embodiment the threaded screw drive members would be replaced by smooth bar elements and bearings coupled to platform 36.

Figure 7:
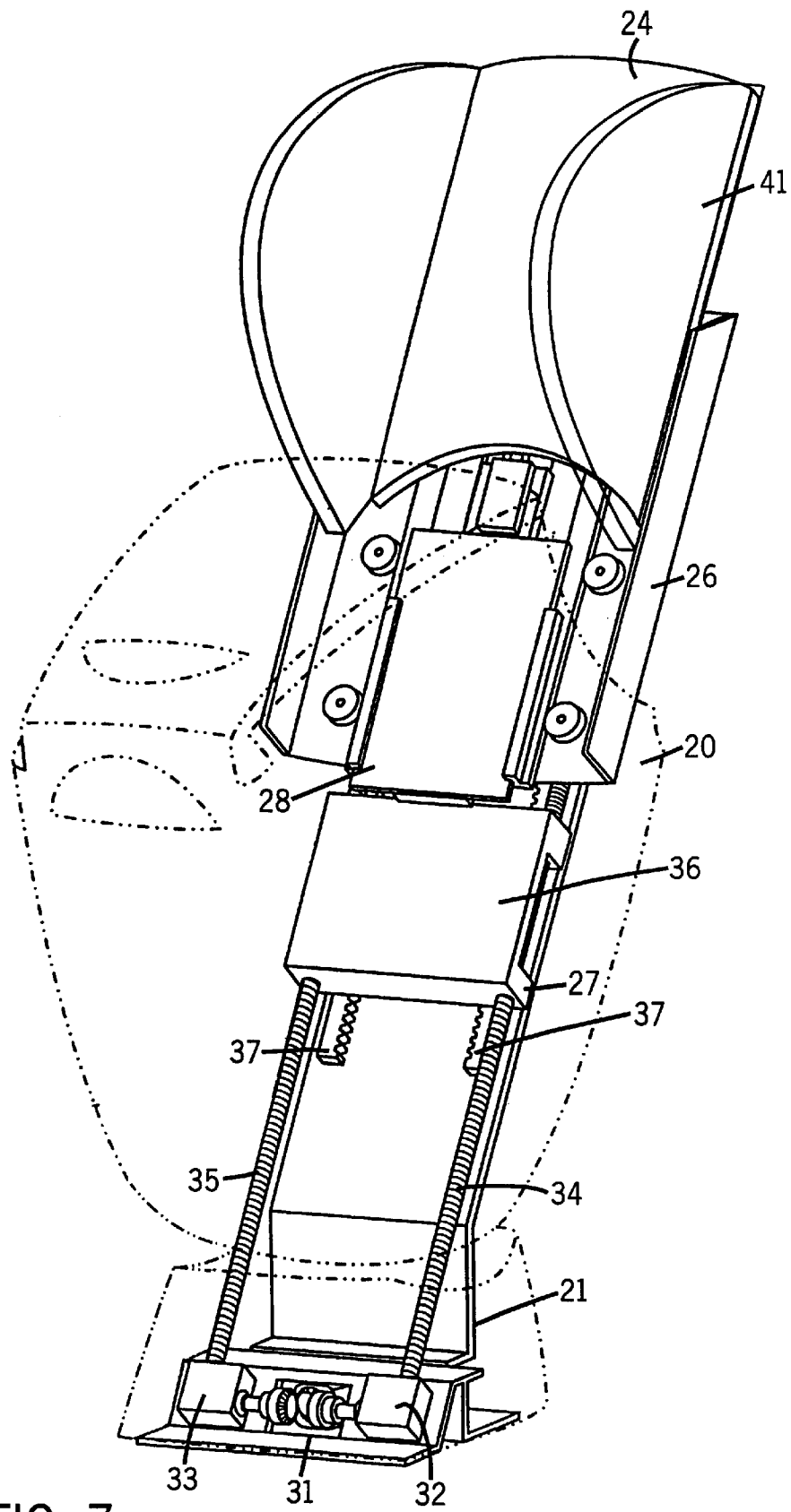
FIG. 7 shows a front perspective view of the foldable table assembly in a partially extracted position in accordance with the teachings of the present invention.

Referring to FIGS. 7 and 8, as the folded table 24 reaches the end of the toothed channel 37, the folded table 24 begins unfolding in a final phase of the folded table 24 extraction sequence.

During the final phase, the U-channel member 26 continues to the end of the toothed channel 37. The table 24 ends its upward travel and is pivoted forward by the table lifter 28 in conjunction with spring members 43 and 44. As the folded table 24 pivots forward, the side wings 41 unfold as they are no longer held by the profile of the U-channel member 26. The spring members 43 and 44 function to support the folded table 24 when the folded table 24 is in its extracted position shown in FIG. 8.

It is to be understood that the invention is not limited to the exact construction illustrated and described above, but that various changes may be made without departing from the scope of the invention as defined in the following claims.

We claim:

1. A center console assembly for use in a vehicle, comprising:
    an imperforate foldable table having a substantially uninterrupted flat surface area, the table capable of being disposed within a console; and
    a linear drive mechanism coupled to said table, wherein said linear drive mechanism includes a driver capable of moving said table from a folded configuration within said console to an unfolded configuration outside of said console.

2. The center console assembly of claim 1 wherein said linear drive mechanism comprises a U-channel support member, said U-channel support member supporting at least a portion of said table.

3. The center console assembly of claim 1, wherein the driver is a pneumatic cylinder.

4. The center console assembly of claim 1, wherein the driver is a drive motor.

5. A center console assembly for use in a vehicle, comprising:
    a table capable of being disposed within a console;
    a linear drive mechanism coupled to the table, wherein the linear drive mechanism includes a driver capable of moving the table from within the console to outside of the console, and wherein the linear drive mechanism comprises a U-channel support member, the U-channel support member supporting at least a portion of the table; and
    a lift mechanism coupled to said linear drive mechanism, wherein said lift mechanism is coupled to said table.

6. The center console assembly of claim 5 further comprising a support member which has at least one toothed track, and wherein said lift mechanism comprises at least one gear for engaging said toothed track.

7. The center console assembly of claim 6 wherein the linear drive mechanism comprises a motor, a differential, and a screw drive.

8. A center console assembly for a vehicle comprising:
    a top portion and a base portion;
    a first and second side wall coupled to said top and base portions;
    a central cavity defined by said top portion, base portion, and side walls;
    an imperforate foldable table having a substantially uninterrupted flat surface area, the table coupled to a linear drive mechanism such that the table is capable of being slidably received in a folded position within said central cavity; and
    means for driving the table from a retracted position to an extracted unfolded position, the means for driving being coupled to the linear drive mechanism.

9. The center console assembly of claim 8 wherein said linear drive mechanism is disposed within said central cavity.

10. The center console assembly of claim 8 further comprising a support member which is capable of supporting said linear drive mechanism.

11. A center console assembly for a vehicle comprising:
    a top portion and a base portion;
    a first and second side wall coupled to said top and base portions;
    a central cavity defined by said top portion, base portion, and side walls;
    an imperforate foldable table having a substantially uninterrupted flat surface area, the table coupled to a linear drive mechanism such that the table is capable of being slidably received in a folded position within said central cavity, wherein the linear drive mechanism is disposed within the central cavity and has a primary driven member driven by at least one screw drive member; and
    means for driving the table from a retracted position to an extracted unfolded position, the means for driving being coupled to the linear drive mechanism.

12. A center console assembly for a vehicle comprising:
    a top portion and a base portion;
    a first and second side wall coupled to the top and base portions;
    a central cavity defined by said top portion, base portion, and side walls;
    a table having a substantially interrupted flat surface area, the table coupled to a linear drive mechanism such that the table is capable of being slidably received within the central cavity, wherein the linear drive mechanism has a primary driven member driven by at least one screw drive member and further comprises a U-channel member driven by the primary driven member, the U-channel member supporting the table; and
    means for driving the table from a retracted position to an extracted position, the means for driving being coupled to the linear drive mechanism.

13. The center console assembly of claim 12 further having a table lifter mechanism coupled to said primary driven member.

14. A linear lift mechanism for a folded table comprising:
    a screw drive mechanism for lifting said folded table;
    a U-channel member supporting said folded table, coupled to said screw drive mechanism;

a table lift mechanism disposed on said U-channel member; and a support member having a toothed region, and wherein said table lift mechanism comprises at least on drive gear coupled to said toothed region.

15. The linear lift mechanism of claim 14 further comprising a spring member for supporting said folded table.

16. The linear lift mechanism of claim 15 further comprising a motor coupled to said screw drive mechanism.

17. The linear lift mechanism of claim 16 wherein said motor is coupled to said screw drive mechanism through a differential.

18. The linear lift mechanism of claim 17 wherein said U-channel member is capable of traveling at a first speed and said table lift mechanism is capable of traveling at a second speed.

* * * * *